US010429911B2

(12) United States Patent
Adrian

(10) Patent No.: US 10,429,911 B2
(45) Date of Patent: Oct. 1, 2019

(54) APPARATUS, SYSTEM, AND METHOD FOR DETECTING DEVICE TYPES OF STORAGE DEVICES

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/698,540

(22) Filed: Sep. 7, 2017

(65) Prior Publication Data
US 2019/0073008 A1  Mar. 7, 2019

(51) Int. Cl.
*G06F 1/26*  (2006.01)
(52) U.S. Cl.
CPC ....................... *G06F 1/26* (2013.01)
(58) Field of Classification Search
None
See application file for complete search history.

(56) References Cited

U.S. PATENT DOCUMENTS

| | | |
|---|---|---|
| 3,601,463 A | 8/1971 | Watt |
| 3,996,500 A | 12/1976 | Coules |
| D294,800 S | 3/1988 | Nilsson |
| 4,969,065 A | 11/1990 | Petri |
| 5,262,705 A * | 11/1993 | Hattori .................... G05F 1/577 318/479 |
| 5,281,149 A | 1/1994 | Petri |
| 5,724,803 A | 3/1998 | Pea |
| 5,793,614 A | 8/1998 | Tollbom |
| 5,957,659 A | 9/1999 | Amou |
| 6,109,767 A | 8/2000 | Rodriguez |
| 6,116,375 A | 9/2000 | Lorch |
| 6,159,031 A | 12/2000 | Llapitan |
| 6,181,549 B1 | 1/2001 | Mills |
| 6,331,915 B1 | 12/2001 | Myers |
| 6,385,051 B1 | 5/2002 | Perez et al. |
| 6,404,646 B1 | 6/2002 | Tsai |
| 6,469,899 B2 | 10/2002 | Hastings |
| 6,515,854 B1 | 2/2003 | Claprood |

(Continued)

OTHER PUBLICATIONS

Acoustic Attenuation; https://en.wikipedia.org/wiki/Acoustic_attenuation; Oct. 22, 2012.

(Continued)

*Primary Examiner* — Danny Chan
(74) *Attorney, Agent, or Firm* — FisherBroyles, LLP

(57) ABSTRACT

An apparatus for detecting device types of storage devices may include (1) at least one circuit that (A) is electrically coupled to a power supply and (B) when a storage device is connected to the power supply, outputs a signal that is indicative of a device type of the storage device, (2) at least one physical processing device that (A) is electrically coupled to the circuit, (B) detects the signal that is output by the circuit when the storage device is connected to the power supply, (C) determines the device type of the storage device based at least in part on the signal output by the circuit, and then (D) directs the power supply to supply power to the storage device in accordance with the device type of the storage device. Various other apparatuses, systems, and methods are also disclosed.

20 Claims, 6 Drawing Sheets

(56) References Cited

U.S. PATENT DOCUMENTS

| | | | |
|---|---|---|---|
| 6,621,692 B1 | 9/2003 | Johnson | |
| 6,695,629 B1 | 2/2004 | Mayer | |
| 6,791,843 B1 | 9/2004 | Dobbs | |
| 6,798,669 B1 | 9/2004 | Hsu | |
| 6,813,165 B2 | 11/2004 | Cheng | |
| 6,987,674 B2 | 1/2006 | El-Batal | |
| 6,995,982 B2 | 2/2006 | Gonzalez | |
| 7,004,764 B2 | 2/2006 | Boudreau | |
| 7,084,654 B2 | 8/2006 | Zhao | |
| 7,088,579 B1 | 8/2006 | Konshak | |
| 7,167,371 B2 | 1/2007 | Coles | |
| 7,301,778 B1 | 11/2007 | Fang | |
| 7,411,787 B2 | 8/2008 | Katakura | |
| 7,423,354 B2* | 9/2008 | Suzuki | G06F 1/26 307/28 |
| 7,505,286 B2 | 3/2009 | Brovald | |
| 7,515,413 B1 | 4/2009 | Curtis | |
| 7,649,750 B2 | 1/2010 | Lee | |
| 8,020,902 B1 | 9/2011 | Li | |
| 8,127,059 B1* | 2/2012 | Carr | G06F 13/387 710/74 |
| 8,310,828 B2 | 11/2012 | Collins | |
| 8,331,095 B2 | 12/2012 | Hu et al. | |
| 8,369,080 B2 | 2/2013 | Huang | |
| 8,570,720 B2 | 10/2013 | Yao | |
| 8,636,528 B2 | 1/2014 | Sass et al. | |
| 8,657,619 B2 | 2/2014 | Lin | |
| 8,743,549 B2 | 6/2014 | Frink et al. | |
| 8,749,966 B1 | 6/2014 | Boudreau | |
| 8,848,349 B2 | 9/2014 | Ke | |
| 8,944,538 B2 | 2/2015 | Li | |
| 8,971,052 B2 | 3/2015 | Fu | |
| 9,066,438 B2 | 6/2015 | Chen | |
| 9,070,419 B1 | 6/2015 | Zhu | |
| 9,098,233 B2 | 8/2015 | Keffeler | |
| 9,101,210 B2 | 8/2015 | Lin | |
| 9,203,188 B1 | 12/2015 | Siechen | |
| 9,298,230 B2 | 3/2016 | Wei | |
| 9,313,909 B1 | 4/2016 | Huang | |
| 9,354,003 B2 | 5/2016 | Lin | |
| 9,448,601 B1 | 9/2016 | Beall et al. | |
| 9,454,190 B2 | 9/2016 | Mao et al. | |
| 9,456,519 B2 | 9/2016 | Bailey | |
| 9,461,389 B2 | 10/2016 | Novack | |
| 9,538,684 B2 | 1/2017 | Chen | |
| 9,545,028 B2 | 1/2017 | Hoshino | |
| 9,572,276 B2 | 2/2017 | Haroun | |
| 9,583,877 B1 | 2/2017 | Angelucci | |
| 9,609,778 B1 | 3/2017 | Spencer | |
| 9,763,350 B2 | 9/2017 | Rust | |
| 9,763,353 B1 | 9/2017 | Beall | |
| 9,795,052 B2 | 10/2017 | Hsiao | |
| 9,936,611 B1 | 4/2018 | Beall et al. | |
| 9,949,407 B1 | 4/2018 | Beall | |
| 10,058,006 B2 | 8/2018 | Hung et al. | |
| 2003/0183448 A1 | 10/2003 | Van Sleet | |
| 2003/0200472 A1* | 10/2003 | Midorikawa | G06F 1/26 713/300 |
| 2003/0200475 A1 | 10/2003 | Komoto | |
| 2005/0057909 A1 | 3/2005 | El-Batal et al. | |
| 2005/0136747 A1 | 6/2005 | Caveney et al. | |
| 2005/0182874 A1* | 8/2005 | Herz | G06F 13/385 710/74 |
| 2005/0238421 A1 | 10/2005 | Doerr | |
| 2006/0075155 A1* | 4/2006 | Fuller | G06F 3/0607 710/16 |
| 2006/0134953 A1 | 6/2006 | Williams | |
| 2006/0146507 A1 | 7/2006 | Lee | |
| 2006/0274508 A1 | 12/2006 | Lariviere | |
| 2007/0195542 A1 | 8/2007 | Metros | |
| 2007/0230111 A1 | 10/2007 | Starr | |
| 2007/0233781 A1 | 10/2007 | Starr | |
| 2007/0234081 A1* | 10/2007 | Makino | G06F 1/187 713/300 |
| 2008/0007913 A1 | 1/2008 | Tavassoli | |
| 2008/0117569 A1 | 5/2008 | Lee | |
| 2008/0195786 A1* | 8/2008 | Lee | G06F 3/0607 710/302 |
| 2008/0264192 A1 | 10/2008 | Christensen | |
| 2009/0245745 A1 | 10/2009 | Krampotich | |
| 2009/0271950 A1 | 11/2009 | Wang | |
| 2009/0274429 A1 | 11/2009 | Krampotich | |
| 2009/0310303 A1 | 12/2009 | Najbert | |
| 2010/0195304 A1 | 8/2010 | Takao | |
| 2010/0296791 A1 | 11/2010 | Makrides-Saravanos | |
| 2011/0208937 A1* | 8/2011 | Hayashi | G06F 3/0625 711/165 |
| 2011/0273850 A1 | 11/2011 | Chen | |
| 2011/0299237 A1 | 12/2011 | Liang | |
| 2011/0309703 A1 | 12/2011 | Retchloff | |
| 2012/0004772 A1 | 1/2012 | Rahilly | |
| 2012/0020006 A1 | 1/2012 | Xu | |
| 2012/0134086 A1 | 5/2012 | Zhang | |
| 2012/0230815 A1 | 9/2012 | Teramoto | |
| 2012/0257360 A1 | 10/2012 | Sun | |
| 2012/0305745 A1 | 12/2012 | Chen | |
| 2012/0320519 A1 | 12/2012 | Wu et al. | |
| 2013/0058054 A1 | 3/2013 | Zhou | |
| 2013/0258580 A1 | 10/2013 | Nakayama | |
| 2013/0325183 A1 | 12/2013 | Rahilly | |
| 2014/0111930 A1 | 4/2014 | Henderson | |
| 2014/0187068 A1 | 7/2014 | Chia | |
| 2014/0191636 A1 | 7/2014 | Li | |
| 2014/0369002 A1 | 12/2014 | Takeuchi | |
| 2015/0156912 A1 | 6/2015 | Liang | |
| 2015/0163946 A1 | 6/2015 | Kyle | |
| 2015/0208548 A1 | 7/2015 | Chu | |
| 2015/0235673 A1 | 8/2015 | Lo | |
| 2015/0380059 A1 | 12/2015 | Bell et al. | |
| 2016/0018859 A1 | 1/2016 | Mao et al. | |
| 2016/0042768 A1 | 2/2016 | Yang et al. | |
| 2016/0150659 A1 | 5/2016 | Chen | |
| 2016/0150667 A1 | 5/2016 | Xu | |
| 2016/0330858 A1 | 11/2016 | Ehlen | |
| 2017/0325361 A1 | 11/2017 | Chen et al. | |
| 2018/0260349 A1* | 9/2018 | Mondal | G06F 13/366 |
| 2019/0069432 A1 | 2/2019 | Kho et al. | |
| 2019/0069437 A1 | 2/2019 | Adrian et al. | |
| 2019/0069440 A1 | 2/2019 | Adrian | |

OTHER PUBLICATIONS

Electromagnetic Shielding; https://en.wikipedia.org/wiki/Electromagnetic_shielding; May 15, 2016.

Jason David Adrian et al.; Apparatus, System, and Method for Reconfigurable Media-Agnostic Storage; U.S. Appl. No. 15/694,068; filed Sep. 1, 2017.

Jason David Adrian; Apparatus, System, and Method for Indicating the Status of and Securing Hard Drives; U.S. Appl. No. 15/700,112; filed Sep. 9, 2017.

Jason David Adrian; Apparatus, System, and Method for Directing Air in a Storage-System Chassis; U.S. Appl. No. 15/689,650; filed Aug. 29, 2017.

Jason David Adrian et al.; Apparatus, System, and Method for Enabling Multiple Storage-System Configurations; U.S. Appl. No. 15/688,830; filed Aug. 28, 2017.

Jason David Adrian et al.; Apparatus, System, and Method for Securing Hard Drives in a Storage Chassis; U.S. Appl. No. 15/697,405; filed Sep. 6, 2017.

Chuankeat Kho et al.; Removeable Drive-Plane Apparatus, System, and Method; U.S. Appl. No. 15/693,362; filed Aug. 31, 2017.

Chuankeat Kho et al.; Systems and Methods for Mounting Assembly Pull-Handles; U.S. Appl. No. 15/687,406; filed Aug. 25, 2017.

Bisson; How Facebook Does Storage; https://thenewstack.io/facebook-storage.

What's the Difference Between SATA and SAS Hard Drives?; https://www.pickaweb.co.uk/kb/difference-between-sata-sas-hard-drives/.

Jason David Adrian; An Apparatus, System, and Method for Reconfiguring Air Flow Through a Chassis; U.S. Appl. No. 15/716,251; filed Sep. 26, 2017.

(56) References Cited

OTHER PUBLICATIONS

Jason Adrian; Introducing Bryce Canyon: Our next-generation storage platform; https://code.facebook.com/posts/1869788206569924/introducing-bryce-canyon-our-next-generation-storage-platform/; Mar. 8, 2017.
Jason Adrian et al.; Bryce Canyon Storage Specification; Jan. 31, 2017.
Open Compute Project; http://opencompute.org/; as accessed Sep. 29, 2017.
Jason David Adrian; Data-Center Drawer and Cable Track Assembly; U.S. Appl. No. 15/720,647; filed Sep. 29, 2017.
Chuankeat Kho; Apparatus, System, and Method for Securing Computing Components to Printed Circuit Boards; U.S. Appl. No. 15/713,607; filed Sep. 23, 2017.
Chuankeat Kho et al.; Apparatus, System, and Method for Partitioning a Storage-System Chassis; U.S. Appl. No. 15/708,069; filed Sep. 18, 2017.
Chuankeat Kho et al.; Apparatus, System, and Method for Dampening Vibrations Generated by Exhaust Fans; U.S. Appl. No. 15/713,609; filed Sep. 23, 2017.
Chuankeat Kho et al.; Data-Center Rack; Apparatus, System, and Method for Resisting Shock to a U.S. Appl. No. 15/708,075; filed Sep. 18, 2017.

* cited by examiner

APPARATUS, SYSTEM, AND METHOD FOR DETECTING DEVICE TYPES OF STORAGE DEVICES

BACKGROUND

Individuals and organizations increasingly generate and store vast amounts of data. For example, some websites (such as social media platforms) may allow users to upload practically unlimited amounts of text, pictures, videos, and other types of media. The websites may store this data in servers and/or data centers such that the data may later be accessed by the users. To accommodate the ever-growing storage demands of consumers, data storage centers may often contain many thousands of storage devices. These storage devices may include a variety of types of storage media and/or hard drives. In some examples, particular types of storage devices may be designed for and/or most suitable for handling particular types of data. For example, a data-storage system may use Serial Advanced Technology Attachment (SATA) hard drives for lower-priority data and Serial Attached Small (SAS) for higher priority data.

Due to the operational differences between various types of storage devices, some data-storage systems may attempt to identify the type of each device within the systems before supplying power to the devices. In this way, a data-storage system may avoid damaging components of the system as a result of attempting to draw too much power. For example, a cold-storage rack may be powered by a relative small power supply. If this cold-storage power supply attempts to simultaneously supply power to multiple drives (particularly SATA drives, which typically draw a greater amount of power upon being connected to a power supply than SAS drives), the cold-storage power supply may overcurrent and/or malfunction. However, if the data-storage system detects that one or more SATA drives are connected to the cold-storage power supply, the data-storage system may be able to safely operate both the cold-storage power supply and the SATA drives.

Traditional systems for discovering types of hard drives may involve configuring software and/or firmware within the drives to communicate the device type of the drives to a controller or processor. Unfortunately, these systems may generally be slow and/or costly, in addition to requiring inconvenient modifications to individual hard drives. The instant disclosure, therefore, identifies and addresses a need for improved apparatuses, systems, and methods for detecting device types of storage devices.

SUMMARY

As will be described in greater detail below, the instant disclosure describes various apparatuses, systems, and methods for detecting device types of storage devices. In particular, the instant disclosure describes embodiments of a circuit whose output indicates the device type of a storage device that is connected to a data-storage system.

In one example, an apparatus for detecting device types of storage devices may include (1) at least one circuit that (A) is electrically coupled to a power supply and (B) when a storage device is connected to the power supply, outputs a signal that is indicative of a device type of the storage device, (2) at least one physical processing device that (A) is electrically coupled to the circuit, (B) detects the signal that is output by the circuit when the storage device is connected to the power supply, (C) determines the device type of the storage device based at least in part on the signal output by the circuit, and then (D) directs the power supply to supply power to the storage device in accordance with the device type of the storage device.

In some embodiments, the circuit may include a resistor coupled between the power supply and ground. In these embodiments, the circuit may also include a switch connected in series between the resistor and ground such that (1) the circuit outputs a logical high when the switch is open and (2) the switch outputs a logical low when the switch is closed.

In some examples, the storage device may include a section that makes physical contact with the switch. If this section includes an electrically-conductive material, the switch may close. In one embodiment, the electrically-conductive material may include a connector between at least two outputs of the storage device.

In one embodiment, the storage device may represent an SAS hard drive. In general, SAS hard drives may include the electrically-conductive connector. Accordingly, the switch may be closed when an SAS hard drive is connected to the power supply. In some examples, the physical processing device may direct the power supply to immediately begin supplying power to a motor of the SAS hard drive upon detecting that the SAS hard drive is connected to the power supply.

In other embodiments, the storage device may represent a SATA hard drive. In general, SATA hard drives may not include the electrically-conductive connector. Accordingly, the switch may be open when a SATA hard drive is connected to the power supply. In some examples, the physical processing device may direct the power supply to wait for a command before supplying power to a motor within the SATA hard drive.

In some examples, the power supply may supply power to an array of storage devices. Each storage device within the array may be connected to the power supply via a connector that is coupled to a drive-plane board. In addition, each connector may include an instance of the circuit. In some embodiments, the physical processing device may determine a device type of each storage device within the array based at least in part on signals output by the circuits. The physical processing device may then direct the power supply to supply power to each storage device in accordance with the device type of each storage device.

In one example, a system for detecting device types of hard drives may include (1) at least one circuit that (A) is electrically coupled to a power supply and (B) when a hard drive is connected to the power supply, outputs a signal that is indicative of a device type of the hard drive, (2) at least one physical processing device that (A) is electrically coupled to the circuit, (B) detects the signal that is output by the circuit when the hard drive is connected to the power supply, (C) determines the device type of the hard drive based at least in part on the signal output by the circuit, and then (D) directs the power supply to supply power to the hard drive in accordance with the device type of the hard drive.

In some examples, a corresponding method for detecting device types of storage devices may include (1) electrically coupling, to a power supply that supplies power to at least one storage device, a circuit that outputs a signal indicative of a device type of the storage device and (2) electrically coupling, to the circuit, a physical processing device that (A) determines the device type of the storage device based at least in part on the signal output by the circuit and then (B)

directs the power supply to supply power to the storage device in accordance with the device type of the storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
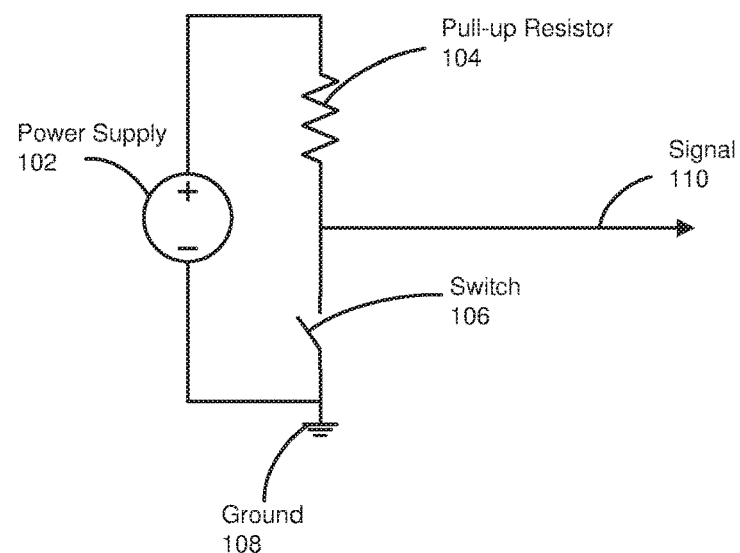
FIG. 1 is an illustration of an exemplary circuit for detecting device types of storage devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for detecting device types of storage devices. As will be explained in greater detail below, embodiments of the instant disclosure may quickly and efficiently identify the device type of one or more storage devices connected to a data-storage system. For example, the disclosed drive-plane board may incorporate, into one or more slots or connectors that secure storage devices within a data-storage system, a circuit whose output is indicative of the device type of the storage device. The output of this circuit may be determined and/or controlled by one or more physical characteristics that represent various device types. In this way, a data-storage system may determine each device type connected to the system before power is supplied to the storage devices. In particular, the data-storage system may determine the device types immediately upon connection of the storage devices without involving the firmware and/or software modifications that may be needed by certain traditional device-type detection systems.

After determining the device type of one or more storage devices connected to a data-storage system, the disclosed embodiments may control and/or operate the storage devices in accordance with their device types. For example, after determining whether a storage device is a SATA hard drive or an SAS hard drive, a data-storage system may direct a power supply to send power to the drive immediately (whether the drive is needed or not) or to wait until the drive is needed to send power to the drive. For example, a storage system may allow any SAS drives in cold storage to power on immediately since SAS drives begin operating background electronic functions (a relatively small power load) upon being connected to a power supply, but may wait to begin operating a motor within the drives (a much higher power load) until receiving a spin-up command from a controller. In contrast, SATA drives may automatically initiate full motor operation when powered on, and a storage system may only send power to SATA drives in cold storage when the drives are needed.

If one or more SATA drives are connected to a cold-storage power supply that is not equipped to handle high power outputs, the cold-storage power supply may overcurrent, thereby malfunctioning or even burning out. However, if the disclosed systems and apparatuses alert the storage system that one or more SATA drives have been plugged in, the power supply may manage (i.e., limit) the number of drives that are powered on at any given time. For example, the power supply may stagger and/or delay the operation of at least a portion of the SATA drives. Accordingly, embodiments of the instant disclosure may efficiently and safely operate both storage devices and power supplies within data-storage systems.

The following will provide, with reference to FIG. 1, detailed descriptions of exemplary circuits that detect device types of storage devices. Detailed descriptions of exemplary apparatuses for detecting device types of storage devices will also be provided in connection with FIG. 2. In addition, detailed descriptions of exemplary hard drives will be provided in connection with FIG. 3. Detailed descriptions of example drive-plane boards and example storage-system drawers that contain drive-plane boards will be provided in connection with FIGS. 4 and 5, respectively. Finally, detailed descriptions of example methods for assembling apparatuses that detect device types of storage devices will be provided in connection with FIG. 6.

FIG. 1 illustrates an exemplary circuit 100. Circuit 100 generally represents any type or form of circuit that outputs a signal indicative of a device type of a storage device. The term "storage device," as used herein, generally refers to any type or form of device capable of storing and/or retrieving data. Examples of storage devices include, without limitation, hard disk drives (e.g., SAS drives and SATA drives), solid state drives, flash memory drives, removable storage devices, combinations of one or more of the same, and/or variations of one or more of the same.

The term "device type," as used herein, generally refers to any category, label, and/or tag that describes a certain type of storage device and/or is assigned to a certain type of storage device. The device type of a storage device may be based on any one or combination of qualities and/or characteristics of the storage device. Examples of such qualities and/or characteristics include, without limitation, an amount of power required to operate a motor within a storage device, a storage medium utilized by a storage device, a physical form factor of a storage device, physical properties of an enclosure or housing of a storage device, variations or combinations of one or more of the same, and/or any other suitable qualities and/or characteristics.

As shown in FIG. 1, circuit 100 may include a power supply 102. Power supply 102 generally represents any type or form of device that supplies electrical energy to a load. In one embodiment, power supply 102 may output power of varying and/or adjustable currents and/or voltages. For example, power supply 102 may be capable of supplying power to two or more types of storage devices that are designed to draw different amounts of power. In addition, power supply 102 may be capable of supplying power to multiple (e.g., dozens) of storage devices simultaneously.

In one embodiment, power supply 102 may represent a cold-storage power supply that is designed to supply power to storage devices that manage infrequently accessed data. Additionally or alternatively, power supply 102 may represent a warm-storage power supply that is designed to supply power to storage devices that manage frequently accessed data. In general, warm-storage power supplies may be capable of outputting a greater amount of power than cold-storage power supplies (e.g., 13 kW compared to 3 kW).

In the example of FIG. 1, circuit 100 may represent and/or include a pull-up circuit. A pull-up circuit may output either a logical low (e.g., ground) or a logical high (e.g., 1V, 5V, etc.) depending on whether a switch within the circuit is open or closed. As shown in FIG. 1, circuit 100 may include a pull-up resistor 104 that is connected to power supply 102. Circuit 100 may also include a switch 106 that is connected in series between pull-up resistor 104 and a ground 108.

Switch 106 generally represents any type or form of electrical component capable of blocking, passing, and/or transmitting power. For example, switch 106 may transmit power when switch 106 is closed and block power when switch 106 is open. Circuit 100 may include any additional or alternative component, such as a diode, a buffer, and/or one or more additional resistors not illustrated in FIG. 1.

In the example of FIG. 1, the output of circuit 100 (i.e., a signal 110) may correspond to the voltage at the node between pull-up resistor 104 and switch 106. When switch 106 is closed, switch 106 may pull signal 110 down to ground, thereby forcing signal 110 to a logical low. When switch 106 is open, switch 106 may cause signal 110 to "float," thereby allowing signal 110 to stay at a logical high.

In some examples, a storage device connected to power supply 102 may provide and/or represent input to switch 106. This input may determine whether switch 106 is open or closed. As will be explained in greater detail below, different types of storage devices may provide different inputs to switch 106. As such, the output of circuit 100 may be based at least in part on the type of storage device that is connected to power supply 102.

Although FIG. 1 illustrates a pull-up circuit, circuit 100 may represent any additional or alternative type of circuit whose output is indicative of a device type of a storage device. For example, circuit 100 may include and/or represent a pull-down circuit (e.g., a circuit that includes a pull-down resistor rather than a pull-up resistor). In addition, some embodiments of circuit 100 may be capable of indicating more than two different device types (e.g., circuit 100 may be capable of outputting more than two different voltage levels).

Figure 2:
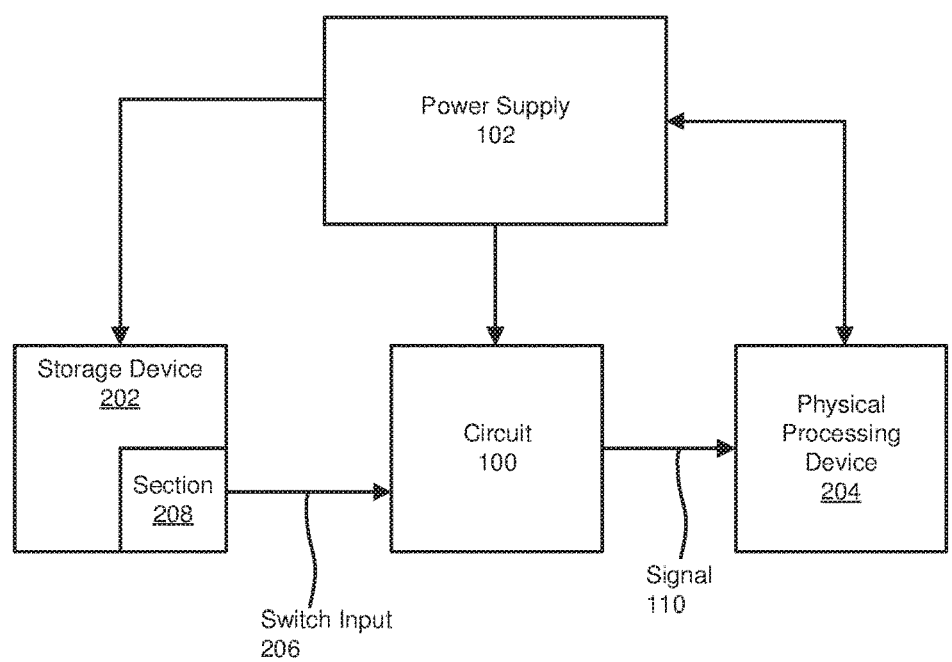
FIG. 2 is a block diagram of an exemplary apparatus for detecting device types of storage devices.

FIG. 2 illustrates an example apparatus 200 that monitors the output of circuit 100. For example, apparatus 200 may include a physical processing device 204 that receives and/or detects signal 110. Physical processing device 204 generally represents any type or form hardware-implemented processing unit capable of interpreting and/or executing computer-readable instructions. Examples of physical processing device 204 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In the example of FIG. 2, power supply 102 may supply power to circuit 100, physical processing device 204, and/or a storage device 202. Storage device 202 may include and/or represent any storage device that is physically connected to switch 106. In one example, storage device 202 may include a section 208 (e.g., a predetermined portion or region) that makes physical contact with switch 106. Accordingly, section 208 may provide and/or represent a switch input 206.

In some examples, switch input 206 may be based on one or more physical properties and/or characteristics of section 208. For example, in the event that section 208 of storage device 202 contains an electrically-conductive material, switch 106 may close when storage device 202 is connected to power supply 102. However, in the event that section 208 of storage device 202 does not contain any electrically-conductive material, switch 106 may remain open after storage device 202 is connected to power supply 102. As such, the presence or absence of an electrically-conductive material within section 208 may determine and/or control the value of signal 110.

In some examples, section 208 may represent an area of a storage device that is known to contain a physical characteristic that is unique to, associated with, and/or indicative of a device type of the storage device. For example, storage device 202 may include and/or represent a specific type of storage device. In this example, section 208 of storage device 202 may correspond to and/or represent an area that contains a certain physical component that is not present on other types of storage devices.

In one embodiment, circuit 100 and/or physical processing device 204 may be configured to differentiate between SAS hard drives and SATA hard drives. While the overall physical shape and/or structure of these hard drives may generally be similar, SAS hard drives may include at least one physical characteristic that distinguishes SAS hard drives from SATA drives. For example, SAS hard drives may include two outputs by which data may be transferred from the hard drives. In some embodiments, these outputs may be connected by an electrically-conductive material. In contrast, SATA hard drives may generally include a single output. As such, SATA hard drives may not include the same type of electrically-conductive connector that is present on SAS hard drives.

Figure 3:
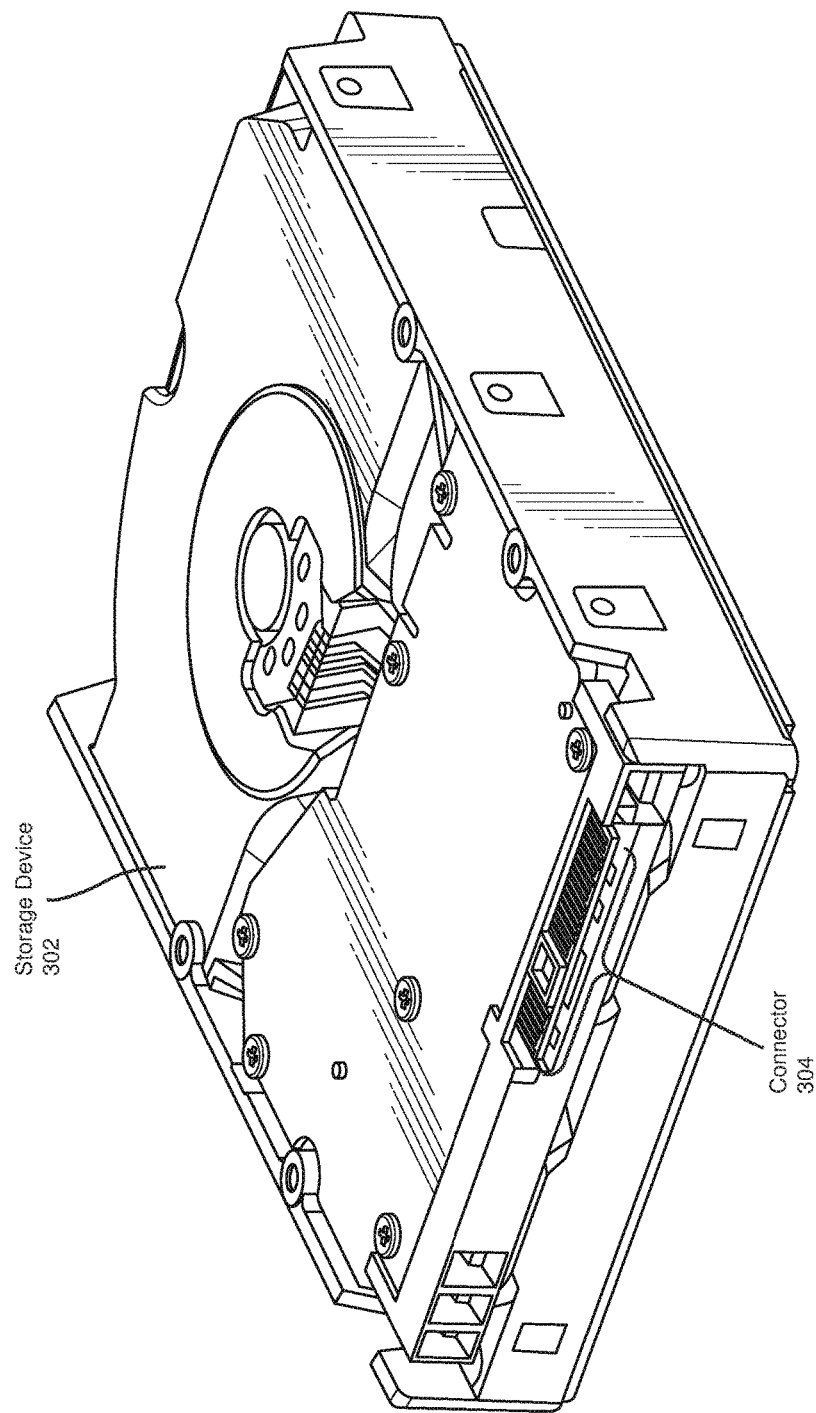
FIG. 3 is an illustration of an exemplary hard drive.

FIG. 3 illustrates an example storage device 302. In this example, storage device 302 may represent an SAS hard drive. As shown in FIG. 3, storage device 302 may include a connector 304. In one embodiment, connector 304 may contain and/or represent an electrically-conductive material positioned between at least two outputs of storage device 302. In this embodiment, connector 304 of storage device 302 may correspond to section 208 of storage device 202.

Because SAS hard drives include electrically-conductive connectors (such as connector 304 in FIG. 3), connecting an SAS hard drive to circuit 100 may close switch 106. As such, signal 110 of circuit 100 may correspond to a logical low when an SAS hard drive is connected to circuit 100. Conversely, because SATA hard drives do not include electrically-conductive connectors, switch 106 may remain open when a SATA hard drive is connected to circuit 100. Signal 110 may therefore correspond to a logical high. By monitoring signal 110, physical processing device 204 may efficiently determine whether a hard drive connected to circuit 100 is an SAS drive or a SATA drive.

After detecting the device type of a storage device connected to circuit 100, physical processing device 204 may direct power supply 102 to supply power to the storage device in accordance with the detected device type. For example, different types of storage devices may be designed to operate at different power levels and/or use differing amounts of power at different times during their operation. In one embodiment, a SATA drive may be designed to immediately require lull power. Accordingly, in response to detecting a SATA drive, physical processing device 204 may determine whether sufficient power is available to turn the drive on.

Conversely, an SAS drive may be designed to wait to operate a motor within the drive until receiving a spin-up command from a processing device. As such, in response to detecting an SAS drive, physical processing device 204 may direct power supply 102 to freely power on SAS drives since SAS drives may only draw minimal power while idle.

Some data-storage systems may generally operate SAS drives using warm-storage power supplies and SATA drives using cold-storage power supplies. As mentioned above, warm-storage power supplies may be capable of outputting greater amounts of power than cold-storage power supplies. As such, data-storage systems may incorporate apparatus 200 to appropriately and/or safely supply power from both warm-storage and cold-storage power supplies. For example, upon detecting that multiple SATA drives have been connected to a cold-storage power supply, a data-storage system may postpone and/or stagger the operation of one or more of the drives to ensure that the cold-storage power supply is not overburdened.

Physical processing device 204 may direct power supply 102 to supply power to detected storage devices in any additional and/or suitable manner. In some examples, physical processing device 204 may also direct additional components of a data-storage system to operate in accordance with the device types of detected storage devices. For example, physical processing device 204 may optimize the performance of components such as input/output modules, storage-control modules, and/or cooling systems based at least in part on the device types of one or more storage devices that interact with these components.

Figure 4:
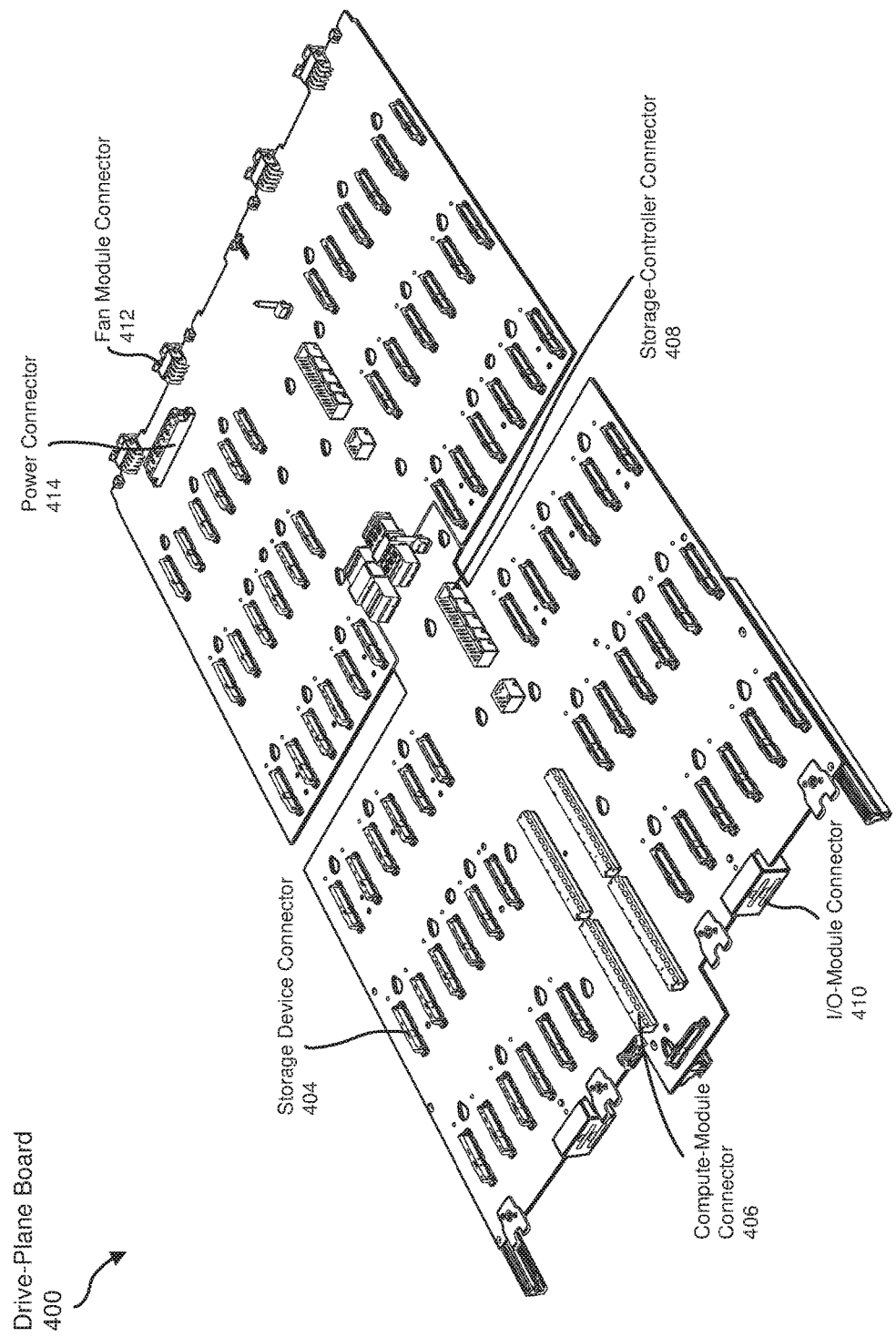
FIG. 4 is a perspective view of an exemplary drive-plane board.

FIG. 4 illustrates an example drive-plane board 400 that may facilitate operation of multiple storage devices. Drive-plane board 400 generally represents any structure that is adapted to connect the various active components (e.g., compute modules, storage devices, storage-controller modules, and input/output modules) that make up a storage system and/or secure the components within a chassis. In some examples, drive-plane board 400 may be one or more printed circuit boards (PCBs) that include various connectors that are electrically connected by conductive traces. In some examples, drive-plane board 400 may be configured to support up to 72 storage devices, up to four fans, one or more sensors (e.g., temperature sensors or drawer open sensors), and/or one or more processing devices (such as physical processing device 204). Drive-plane board 400 may also contain and/or be electrically coupled to one or more power supplies, such as power supply 102.

As shown in FIG. 4, drive-plane board 400 may include various types of mounted connectors. In some examples, drive-plane board 400 may include 72 storage-device connectors 404. Each of storage-device connectors 404 may be configured to interface with a single storage device, such as storage device 202 in FIG. 2. In one embodiment, each of storage-device connectors 404 may be configured to interface with two or more different types of storage devices (e.g., SAS hard drives and SATA hard drives). Drive-plane board 400 may also include one or more additional connectors that interface with additional modules and/or components of a data-storage system. For example, as shown in FIG. 4, drive-plane board 400 may include one or more instances of a compute-module connector 406, a storage-controller connector 408, an input/output-module connector 410, a fan module connector 412, and/or a power connector 414.

In some embodiments, each of storage-device connectors 404 may be connected to one or more power supplies and/or one or more processing devices. For example, each of storage-device connectors 404 may receive power from power supply 102. In this example, power supply 102 may represent either a warm-storage power supply or a cold-storage power supply. In addition, physical processing device 204 may control the amount of power that power supply 102 supplies to each storage device connected to storage-device connectors 404. Furthermore, each of storage-device connectors 404 may contain and/or be connected to an instance of circuit 100. In this way, physical processing device 204 may monitor the output of each instance of circuit 100 to determine the device type of each storage device that is connected to storage-device connectors 404.

Figure 5:
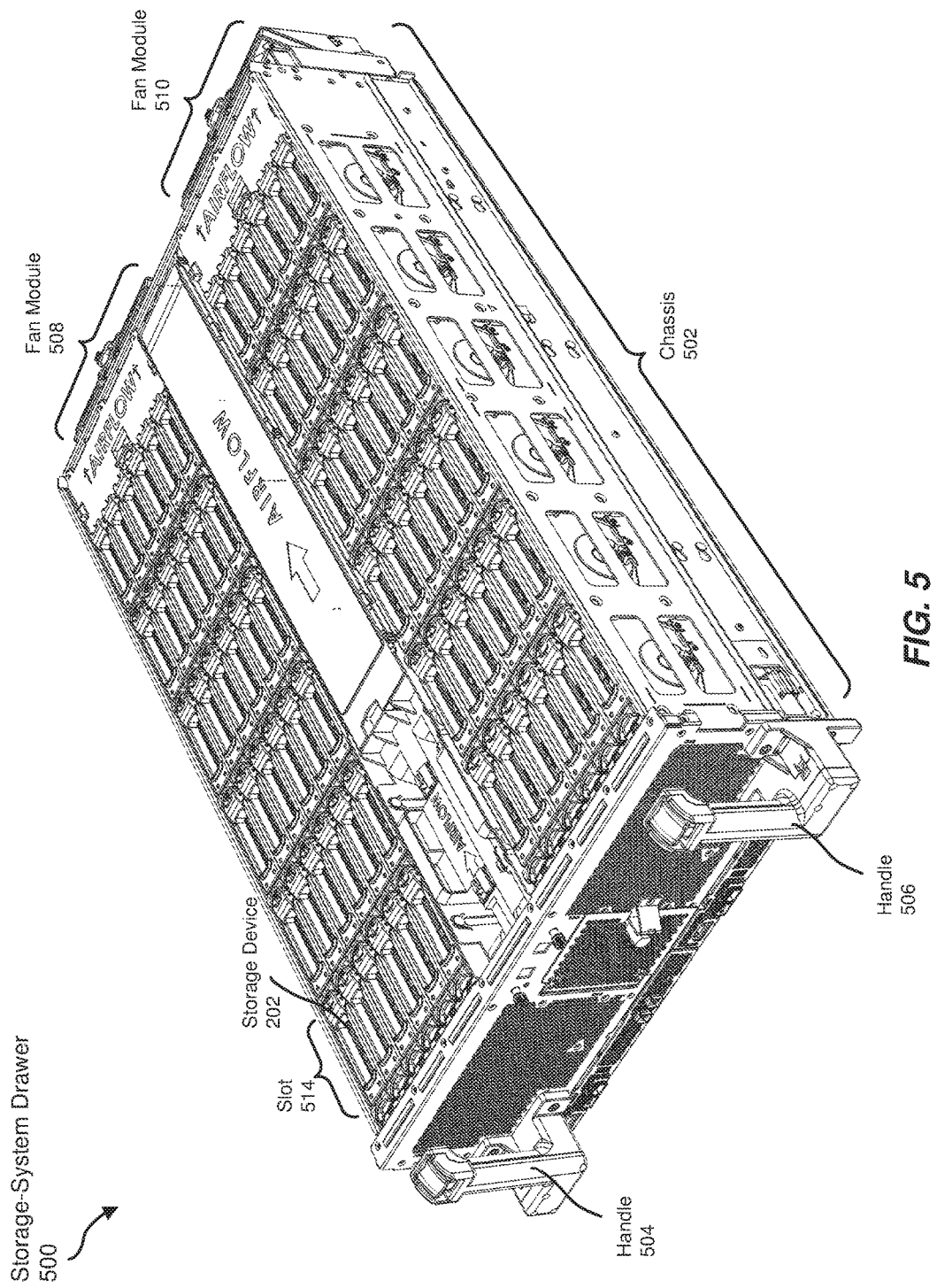
FIG. 5 is a perspective view of an exemplary storage-system drawer.

FIG. 5 shows a perspective view of an example storage-system drawer 500 within which drive-plane board 400 has been installed. The term "storage-system drawer," as used herein, generally refers to any structure that is adapted to house the various components that make up a storage system. In some examples, a chassis 502 (e.g., a metallic enclosure) of storage-system drawer 500 may be sized to house all of the storage-system components described in connection with FIG. 4. Chassis 502 may also be adapted to be housed in a data-center rack. As used herein, the term "data-center rack" generally refers to any multi-system chassis structure for housing multiple storage-system drawers and chassis and/or providing support for one or more cables that connect to the storage-system drawers and chassis. In some examples, a data-center rack may also contain power supplies, network switches, and/or battery backup units.

As shown in FIG. 5, storage-system drawer 500 may include a handle 504 and a handle 506. Handles 504 and 506 may enable a technician to easily pull storage-system drawer 500 out from and return storage-system drawer 500 to a data-center rack. In some examples, storage-system drawer 500 may also include a fan module 508 and/or a fan module 510 that generate airflow over the storage devices housed within chassis 502. Although not shown in FIG. 5, storage-system drawer 500 may include a variety of additional components that facilitate the operation of storage devices. In some examples, these components may be connected to and/or operated via one or more of the connectors illustrated in FIG. 4.

In the example of FIG. 5, storage-system drawer 500 may include 72 slots that each hold a single storage device. In one embodiment, drive-plane board 400 may be installed underneath these slots. In this way, drive-plane board 400 may facilitate operation of all or a portion of the storage devices within storage-system drawer 500.

As illustrated in FIG. 5, storage-system drawer 500 may include a slot 514 into which storage device 202 has been inserted. In this example, inserting storage device 202 into slot 514 may physically connect storage device 202 with an instance of circuit 100 that is incorporated into drive-plane board 400. Specifically, slot 514 and drive-plane board 400 may be designed to facilitate physical contact between section 208 of storage device 202 and switch 106 of circuit 100.

In some examples, each additional slot of storage-system drawer 500 may be designed in a similar manner. In this way, physical processing device 204 may easily and efficiently detect the device type of each storage device inserted into these slots. Accordingly, some of the storage devices inserted into these slots may include and/or represent SAS hard drives, while others may include and/or represent SATA hard drives. After determining which storage devices within storage-system drawer 500 are SAS drives and which storage devices are SATA drives, physical processing device 204 may direct power supply 102 to safely and/or appropriately supply power to the drives. In addition, physical processing device 204 may facilitate the operation of each storage device connected to storage-system drawer 500 regardless of whether power supply 102 represents a cold-storage power supply or a warm-storage power supply.

Figure 6:
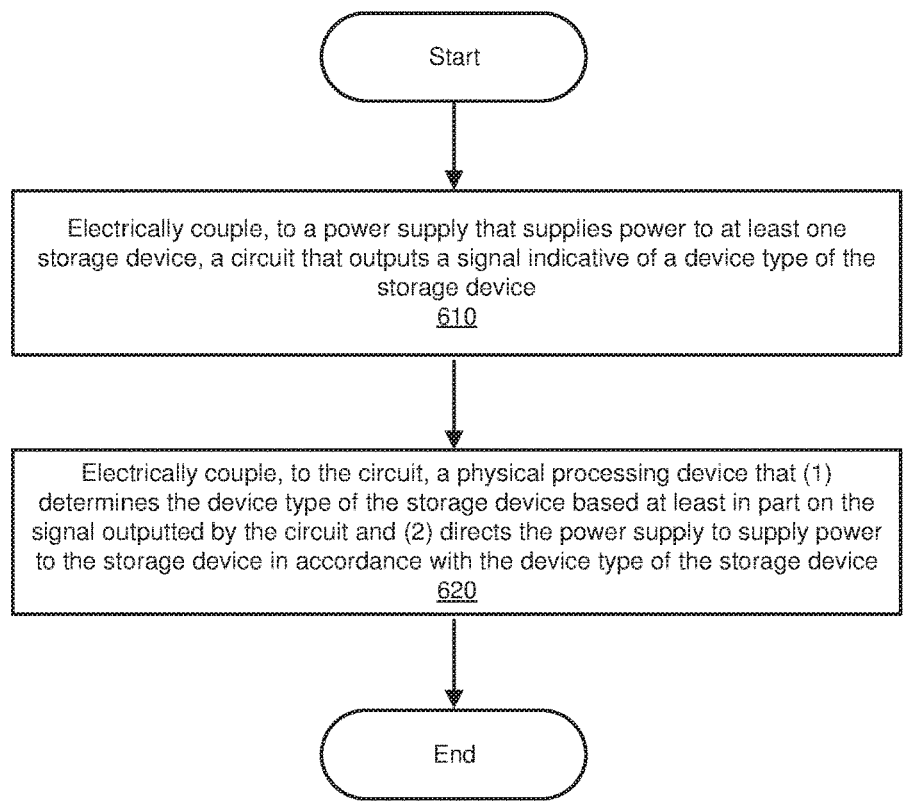
FIG. 6 is a flow diagram of an exemplary method for assembling apparatuses that detect device types of storage devices.

FIG. 6 is a flow diagram of an example method 600 for assembling circuits and apparatuses that detect device types of storage devices. In one example, each of the steps shown in FIG. 6 may represent an algorithm whose structure includes and/or is represented by multiple sub-steps, examples of which will be provided in greater detail below.

At step 610 of method 600, one or more of the apparatuses or systems described herein may electrically couple, to a power supply that supplies power to at least one storage device, a circuit that outputs a signal indicative of a device type of the storage device. In one example, the output of the circuit may be determined and/or controlled by at least one physical characteristic of the storage device that is representative of the device type of the storage device.

Step 610 may be performed in a variety of ways. In one example, this step may be performed by a data-storage system manufacturer that manufacturers data-storage systems that include apparatus 200. When manufacturing such systems, the manufacturer may electrically couple one or more of the components of circuit 100 (including power supply 102, pull-up resistor 104, and switch 106) to a drive-plane board (e.g., drive-plane board 400). In some examples, the manufacturer may electrically couple an instance of circuit 100 to each connector within drive-plane board 400.

At step 620 of method 600, one or more of the apparatuses or systems described herein may electrically couple, to the circuit, a physical processing device that (1) determines the device type of the storage device based at least in part on the signal output by the circuit and (2) directs the power supply to supply power to the storage device in accordance with the device type of the storage device.

Step 620 may be performed in a variety of ways. In one example, while manufacturing a data-storage system that includes apparatus 200, a data-storage system manufacturer may connect physical processing device 204 to circuit 100. Specifically, the manufacturer may connect physical processing device 204 to each instance of circuit 100 that is incorporated into drive-plane board 400. Physical processing device 204 may then determine the device type of each storage device connected to drive-plane board 400 based on the outputs of the instances of circuit 100. Accordingly, physical processing device 204 may direct power supply 102 to supply power to these storage devices in accordance with their device types. For example, physical processing device 204 may direct power supply 102 to adjust the amount of power supplied to a storage device and/or when the power is supplied to the storage device based in part on the device type of the storage device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. An apparatus comprising:
 a drive-plane board comprising a plurality of connectors for coupling a plurality of storage devices to a power supply;
 for each connector in the plurality of connectors, at least one circuit that:
  is electrically coupled to the power supply;
  comprises a resistor coupled between the power supply and ground;
  comprises a switch connected in series between the resistor and ground;
  when a storage device is connected to the power supply, outputs a signal that indicates, based on whether the switch is open or closed, a device type of the storage device; and
  is electrically coupled to at least one physical processing device that:
   detects the signal that is output by the circuit when the storage device is connected to the power supply;
   determines, based at least in part on the signal output by the circuit, whether the device type of the storage device comprises a Serial Attached Small

Computer System Interface (SAS) hard drive or a Serial Advanced Technology Attachment (SATA) hard drive; and directs the power supply to supply power to the storage device in accordance with the device type of the storage device.

2. The apparatus of claim 1, wherein the switch is connected in series between the resistor and ground such that:

the circuit outputs a logical high when the switch is open; and the circuit outputs a logical low when the switch is closed.

3. The apparatus of claim 2, wherein the storage device comprises a section that:

makes physical contact with the switch; and when the section includes an electrically-conductive material, causes the switch to close.

4. The apparatus of claim 3, wherein the electrically-conductive material comprises a connector between at least two outputs of the storage device.

5. The apparatus of claim 4, wherein:

the storage device represents the SAS hard drive;

the SAS hard drive includes the connector; and when the SAS hard drive connects to the power supply, the switch closes.

6. The apparatus of claim 5, wherein the physical processing device directs the power supply to immediately begin supplying power to a motor of the SAS hard drive upon detecting that the SAS hard drive is connected to the power supply.

7. The apparatus of claim 4, wherein:

the storage device represents the SATA hard drive;

the SATA hard drive does not include the connector; and when the SATA hard drive is connected to the power supply, the switch is open.

8. The apparatus of claim 7, wherein the physical processing device directs the power supply to wait for a command before supplying power to a motor within the SATA hard drive.

9. The apparatus of claim 1, wherein, for each connector in the plurality of connectors, the circuit is incorporated into the connector.

10. A system comprising:

a drive-plane board dimensioned to be installed in a data-center rack, wherein the drive-plane board comprises a plurality of connectors for coupling a plurality of storage devices to a power supply;

for each connector in the plurality of connectors:

at least one circuit that:

is electrically coupled to a power supply;

when a hard drive is connected to the power supply;

comprises a resistor coupled between the power supply and ground; and comprises a switch connected in series between the resistor and ground; and at least one physical processing device that:

is electrically coupled to the circuit;

detects the signal that is output by the circuit when the hard drive is connected to the power supply;

determines, based at least in part on a signal that is output by the circuit and that indicates, based on whether the switch is open or closed, whether a device type of the hard drive comprises a Serial Attached Small Computer System Interface (SAS) hard drive or a Serial Advanced Technology Attachment (SATA) hard drive; and directs the power supply to supply power to the hard drive in accordance with the device type of the hard drive.

11. The system of claim 10, wherein the switch is connected in series between the resistor and ground such that:

the circuit outputs a logical high when the switch is open; and the circuit outputs a logical low when the switch is closed.

12. The system of claim 11, wherein the hard drive comprises a section that:

makes physical contact with the switch; and when the section includes an electrically-conductive material, causes the switch to close.

13. The system of claim 12, wherein the electrically-conductive material comprises a connector between at least two outputs of the hard drive.

14. The system of claim 13, wherein:

the hard drive represents the SAS hard drive;

the SAS hard drive includes the connector; and when the SAS hard drive connects to the power supply, the switch closes.

15. The system of claim 14, wherein the physical processing device directs the power supply to immediately begin supplying power to a motor of the SAS hard drive upon detecting that the SAS hard drive is connected to the power supply.

16. The system of claim 13, wherein:

the hard drive represents the SATA hard drive;

the SATA hard drive does not include the connector; and when the SATA hard drive is connected to the power supply, the switch is open.

17. The system of claim 16, wherein the physical processing device directs the power supply to wait for a command before supplying power to a motor within the SATA hard drive.

18. The system of claim 10, wherein for each connector in the plurality of connectors, the circuit is incorporated into the connector.

19. A method comprising:

electrically coupling an array of storage devices to a power supply that supplies power to the storage devices;

for each storage device in the array of storage devices:

electrically coupling, to the power supply, a circuit comprising a resistor coupled between the power supply and ground; and a switch connected in series between the resistor and ground; and electrically coupling, to the circuit, a physical processing device that:

determines, based at least in part on a signal that is output by the circuit and that indicates, based on whether the switch is open or closed, whether a device type of the storage device comprises a Serial Attached Small Computer System Interface (SAS) hard drive or a Serial Advanced Technology Attachment (SATA) hard drive; and directs the power supply to supply power to the storage device in accordance with the device type of the storage device.

20. The method of claim 19, wherein electrically coupling the circuit to the power supply comprises:

coupling the resistor between the power supply and ground; and connecting the switch in series between the resistor and ground such that:
    the circuit outputs a logical high when the switch is open; and
    the circuit outputs a logical low when the switch is closed.

\* \* \* \* \*